F. CHADIMA.
VENT VALVE FOR CHURNS.
APPLICATION FILED JULY 10, 1916.
1,244,292.
Patented Oct. 23, 1917.
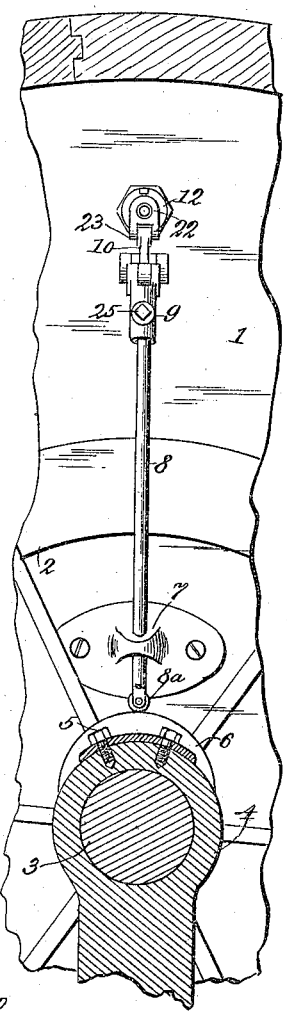
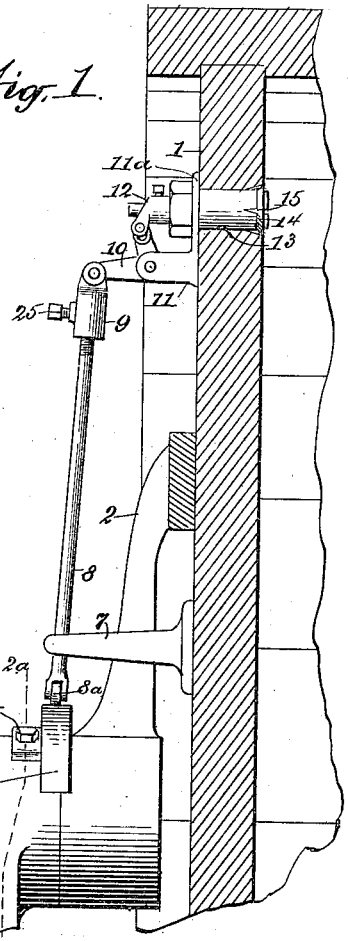
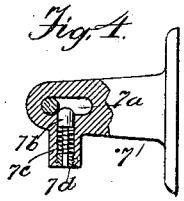
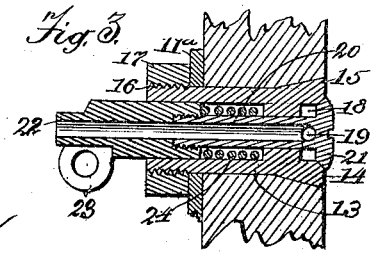
Witnesses
L. A. St. John
Edith St. John
Inventor
Frank Chadima
By J. M. St. John
Atty.

UNITED STATES PATENT OFFICE.

FRANK CHADIMA, OF CEDAR RAPIDS, IOWA.

VENT-VALVE FOR CHURNS.

1,244,292.  Specification of Letters Patent.  Patented Oct. 23, 1917.

Application filed July 10, 1916. Serial No. 108,504.

*To all whom it may concern:*

Be it known that I, FRANK CHADIMA, a citizen of the United States, residing at Cedar Rapids, in the county of Linn and State of Iowa, have invented certain new and useful Improvements in Vent-Valves for Churns; and I do hereby declare the following to be a full, clear, and exact description of the invention, such as will enable others skilled in the art to which it appertains to make and use the same.

This invention relates to creamery churns, and the object of the invention is to provide such churns with automatic venting mechanism, whereby the gases generated in churning may escape, without the necessity for stopping the churn or otherwise delaying the churning operation.

The invention is fully disclosed in the description and claims following, reference being had to the accompanying drawing, in which:

Figure 1 is a side elevation of a device embodying my invention, a part of the churn being in section. Fig. 2 is an end view of the same. Fig. 3 is a central, longitudinal section of the valve and connected parts. Fig. 4 is a sectional view of an improved rod-guide.

In the drawing, the numeral 1 denotes the head of a churn, to which is attached a spider 2 carrying one of the main journals 3 in its bearing 4. To this bearing is attached, as by screws 5, a cam 6, the cam being mounted on the highest part of the bearing adjacent to the spider. To the adjacent head of the churn is attached a guide-bracket 7, through which passes slidably a rod 8, whose lower end bears a roller $8^a$ riding on the cam. Its upper end connects by a suitable coupling 9 with a bell-crank 10 pivoted on a bracket 11 secured to the churn-head near its outer edge. The other arm of the bell-crank connects with a valve 12, the construction of which is shown in Fig. 3, and is described as follows:

In a hole in the churn-head is set a valve-seat 13, having a slightly flared head 14 and short ribs 15 to give it a proper hold in the wood of the head. Its opposite end is threaded at 16 for a nut 17, and passes through a hole in the flange $11^a$ of the bracket 11, the nut fastening both the valve-seat and the bracket securely in position. The valve end of the valve seat member is chambered at 18 to give communication with holes 19 in the stem of the valve 20, which from the head 21 outwardly is tubular, as shown. Its outer end screws into the sleeve 22 sliding in the outer bore of the valve-seat member. Its outer end has lugs 23 by which it connects with the bell-crank. Between its inner end and the bottom of the bore in the valve-seat shell is mounted a coil spring 24, the tension of which tends normally to hold the valve seated.

It will be evident that as the churn revolves the push-rod 8 will begin to make contact with the cam after the valve is somewhat above the horizontal center of the churn, when the valve may open without allowing any of the cream to escape. The valve is fully opened when at the vertical center, and then gradually closes before it reaches the horizontal center again. In this interval the churn is fully vented, permitting the escape of the gases, which always form in the process of churning, and more especially in the early stages thereof. The apparatus in no wise interferes with the regular operation of the churn, and ventilates it thoroughly, without any stoppage or delay.

It will be noted that the push-rod is screwed into the coupling 9, and fastened with a set-screw 25. This permits any desired adjustment in the length of the rod, so that the opening of the valve may be nicely timed and the extent of its opening regulated at pleasure.

Provision is made for throwing the vent out of action, and without stopping the churn, as it is not generally desirable to vent during the entire churning operation. The device for this purpose is shown in Fig. 4. In this case the guide 7 is provided with a slot $7^a$ for the rod 8, and this is held in place at either end of the slot by a round-ended stop-pin $7^b$, held in operative position by a spring $7^c$ between the head of the stop and the screw collar $7^d$ set in a lateral projection $7^{ee}$ of the guide-bracket 7. By a simple blow of the hand the operator may shift the rod, and thus throw the vent into or out of operation, and without any stoppage in the revolution of the churn.

Having thus described my invention, I claim:

1. In combination with a churn and one of its bearings, a cam mounted thereon, a vent-valve near one side of the churn-barrel, with automatic means for closing the same, an opening lever therefor, and a push-rod connecting with said lever at its outer end, the other end being shiftable into and out of engagement with said cam, and during the revolution of the churn.

2. In combination with a churn and one of its bearings, a cam mounted thereon, a vent-valve near one side of the churn-barrel, an opening lever therefor, a push-rod coöperating with the lever to open the valve in passing over the cam, a guide in which the rod is shiftably mounted, and a yielding stop adapted to hold the rod in and out of operative positions.

In testimony whereof I affix my signature in presence of two witnesses.

FRANK CHADIMA.

Witnesses:
G. E. MELSA,
F. REGAN.

Copies of this patent may be obtained for five cents each, by addressing the "Commissioner of Patents, Washington, D. C."